United States Patent [19]

Tanaka

[11] 4,438,378

[45] Mar. 20, 1984

[54] MOTOR DRIVE APPARATUS

[75] Inventor: Tosio Tanaka, Gunma, Japan

[73] Assignee: Tokyo Shibaura Denki Kabushiki Kaisha, Kawasaki, Japan

[21] Appl. No.: 341,626

[22] Filed: Jan. 22, 1982

[30] Foreign Application Priority Data

Jan. 30, 1981 [JP] Japan .............................. 56-11057[U]
Jun. 25, 1981 [JP] Japan .............................. 56-93974[U]

[51] Int. Cl.$^3$ .............................................. H02P 1/22
[52] U.S. Cl. ......................................................... 318/280
[58] Field of Search ................ 318/280, 281, 283–285, 318/447, 466, 139, 256, 264

[56] References Cited

U.S. PATENT DOCUMENTS

| | | | |
|---|---|---|---|
| 3,229,181 | 8/1962 | Evans ..................... | 318/293 |
| 4,275,340 | 6/1981 | Schleupen .................. | 318/256 |
| 4,338,552 | 7/1982 | Pilz et al. ................... | 318/284 |

Primary Examiner—J. V. Truhe
Assistant Examiner—A. Evans
Attorney, Agent, or Firm—Cushman, Darby & Cushman

[57] ABSTRACT

A reversible motor drive circuit for driving a motor in a first direction and thereafter driving the motor in a second direction opposite to said first direction. The circuit includes a first flip-flop having cross-coupled 1st and 2nd PNP transistors. The emitters of 1st and 2nd transistors are adapted to be coupled via a power switch to a power supply. The collectors of 1st and 2nd transistors are respectively coupled to opposite terminals of a DC reversible motor which are respectively coupled to the collectors of 3rd and 4th NPN transistors. The base of 3rd transistor is coupled to the collector of 4th transistor via an RC circuit having a first time constant. The base of 4th transistor is coupled to the collector of 3rd transistor via an RC circuit having a second time constant. The RC circuits and 3rd and 4th transistors form a second flip-flop coupled to the first flip-flop and the motor, wherein the first time constant is larger than the second time constant.

6 Claims, 13 Drawing Figures

FIG. 1
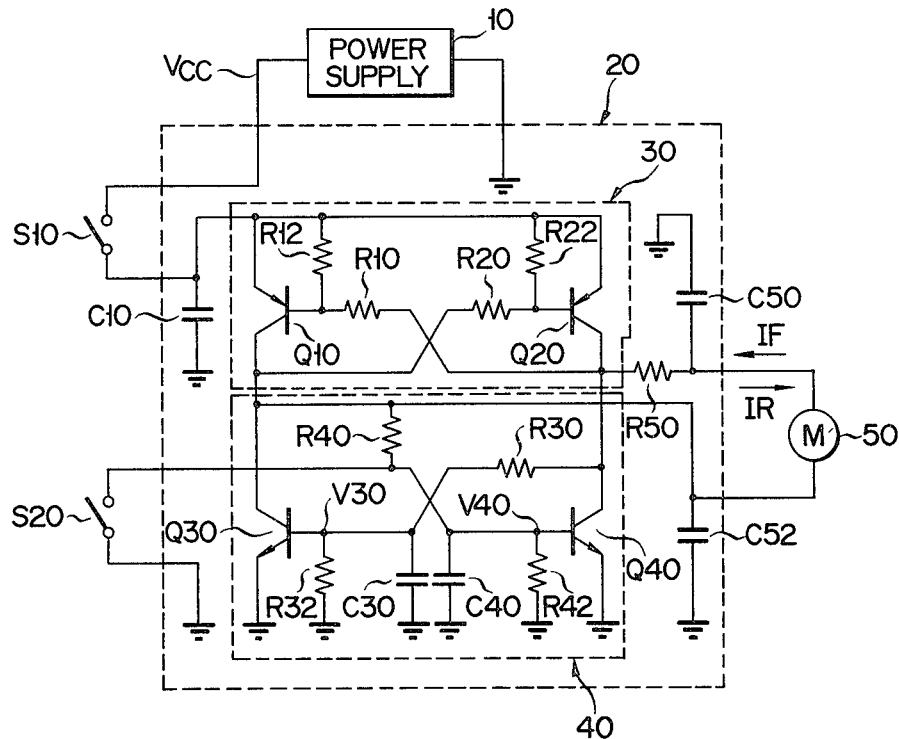
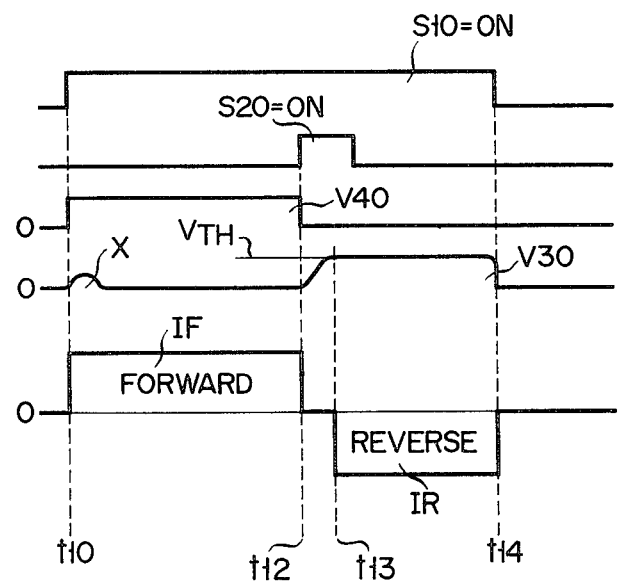

FIG. 3
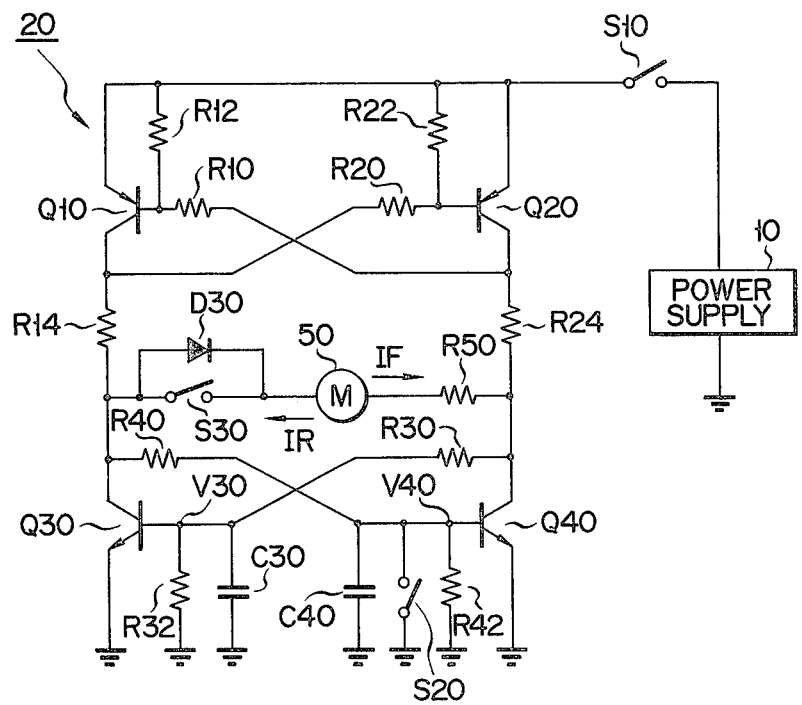
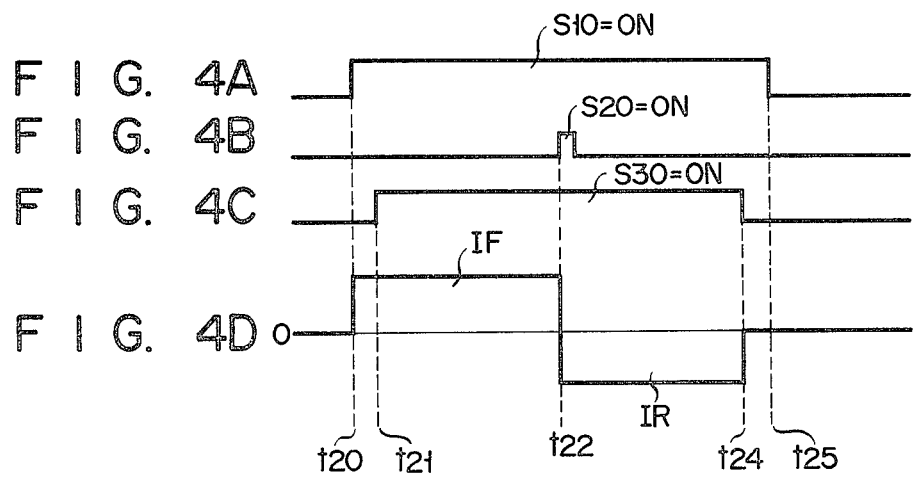

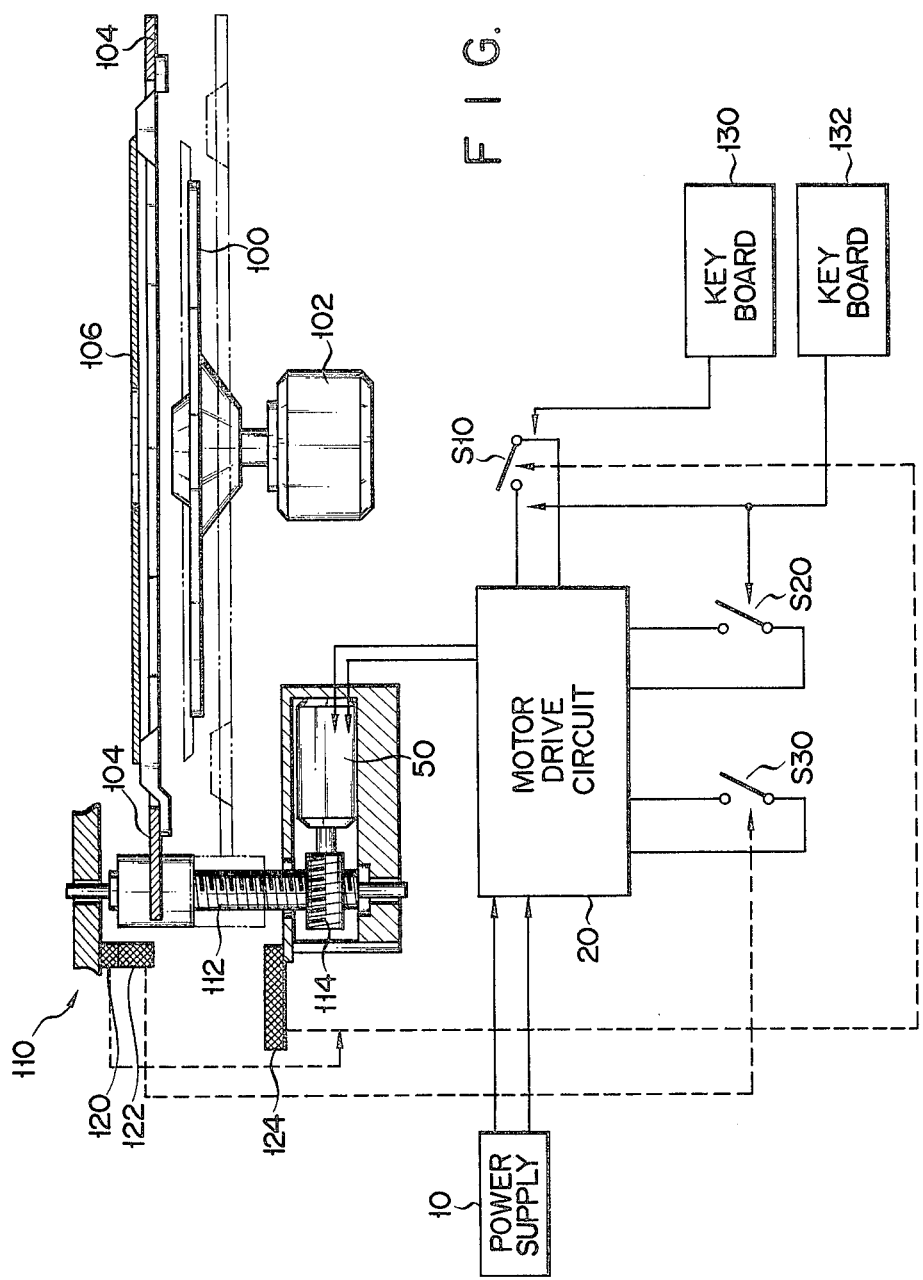

MOTOR DRIVE APPARATUS

BACKGROUND OF THE INVENTION

This invention relates to an electrically-controlled actuator for moving a carriage in forward and reverse directions, particularly to a motor drive apparatus suitable for an automatic loading apparatus of a video disc player in which a protective casing for containing a video disc is drawn into the player and then the casing is pushed out therefrom, automatically.

A motor drive apparatus is available for moving a carriage in a given sequential order. In such apparatus a switching circuit for forwardly driving, reversely driving or stopping a motor is equipped. For the switching circuit a high reliability and a low power consumption are desired.

A conventional switching circuit for the above usage generally has a relay circuit with proper switches which designate the rotational direction and start/stop of the motor. Since the relay circuit requires a certain space, it is hard to reduce the size in the conventional circuit. Further, since the conventional one has many mechanical contacts, the operational reliability is low. Still further, the mechanical contacts are liable to generate sparks and electrical noises, and additionally, a relay is relatively expensive.

A semiconductor switch circuit may overcome the above-mentioned drawbacks of mechanical relays. One example of the semiconductor switch is disclosed in U.S. Pat. No. 3,896,358. This U.S. patent teaches that a switching circuit for forwardly driving, reversely driving or stopping the motor is obtained without a mechanical relay. In the circuitry of this U.S. patent, however, a complicated switching circuit is necessary for surely fixing the starting condition of motor actuation at the initial stage, e.g. the time of power ON.

SUMMARY OF THE INVENTION

It is accordingly an object of this invention to provide a motor drive apparatus which ensures that the motor actuation at the initial stage of operation is fixed at a certain condition without complicated switching circuit.

According to the present invention, a first flip-flop including a pair of cross-coupled first and second transistors of PNP type is provided. The emitters of first and second transistors is coupled via a power switch to the positive terminal of a power supply. The collectors of first and second transistors are respectively coupled to the both terminals of a rotation-reversible motor. One terminal of the motor is coupled to the collector of a third transistor of NPN type, and the other terminal thereof is coupled to the collector of a fourth transistor of NPN type. A first coupling circuit having a first time constant is connected between the base of third transistor and the collector of fourth transistor. A second coupling circuit having a second time constant is connected between the base of fourth transistor and the collector of third transistor. The third and fourth transistors being cross-coupled through the first and second time constant circuits form a second flip-flop. The emitters of third and fourth transistors are coupled to the circuit ground of the negative terminal of the power supply. The base of fourth transistor receives a trigger signal for cutting off the fourth transistor.

In the above construction, the first and second time constants are so selected that the fourth transistor is always rendered conductive when the first switch is turned on. For instance, if the first and second time constant circuits are CR type low pass filters, and the time constants of the first and second low pass filters are TC1 and TC2, TC1>TC2 is held so that the fourth transistor is conducted without fail when the power switch is turned on. Then, by the flip-flop operation, the first and fourth transistors are rendered conductive, whereas the second and third transistors are nonconductive. In this case the motor rotates forwardly (e.g. cw). When the fourth transistor receives the trigger signal, the first and fourth transistors are turned off, and the second and third transistors are conducted by the flip-flop operation. In this case the motor rotates reversely (e.g. ccw).

If a stop switch is located on a current path including the conducted second and third transistors and the motor, the stop switch enables to stop the motor after triggering of the fourth transistor. That is, the motor rotates in a forward direction at the time when the power switch is turned on, and the rotational direction of the motor is reversed by the triggering of fourth transistor, and then the motor is stopped by OFF of the stop switch.

BRIEF DESCRIPTION OF THE DRAWINGS

The object and advantage of the present invention will become apparent to persons skilled in the art from a study of the following description of the accompanying drawings.

FIG. 1 is a circuit diagram of a motor drive apparatus according to the present invention;

FIGS. 2A to 2E are waveforms useful for explaining the operation of FIG. 1 apparatus;

FIG. 3 is a second embodiment of the present invention;

FIGS. 4A to 4D are waveforms for explaining the operation of FIG. 3 apparatus;

FIG. 6 shows an application example of the motor drive apparatus of the present invention.

DETAILED DESCRIPTION OF THE PREFERRED EMBODIMENTS

Figure 5:
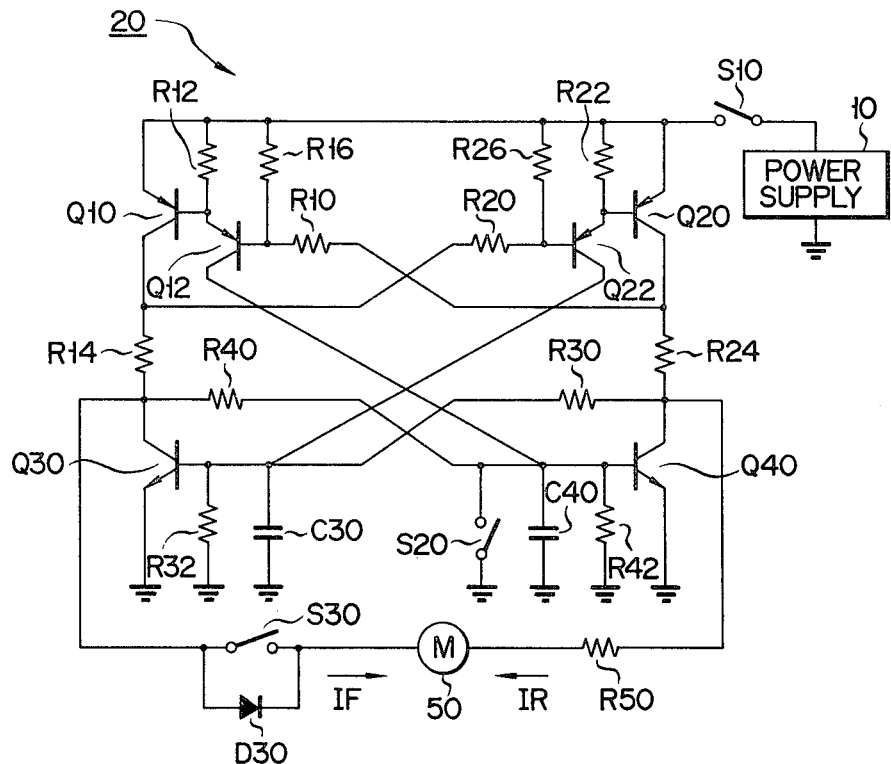
FIG. 5 is a third embodiment of the present invention.

Before proceeding to the description of the embodiments, it is noted that the same or similar reference symbols are used to designate the same or similar portions throughout the drawings for brevity's sake.

Referring now to FIG. 1, a power supply 10 generates a positive voltage Vcc. The voltage Vcc is applied via a power switch S10 to the emitters of PNP transistors Q10 and Q20. These emitters are grounded via a capacitor C10 which eliminates the influence of chattering of switch S10. The base of transistor Q10 is connected to the collector of transistor Q20 through a resistor R10 and also to its emitter through a resistor R12. The base of transistor Q20 is connected to the collector of transistor Q10 via a resistor R20 and to its emitter via a resistor R22. Such cross-coupled transistors Q10 and Q12 form a first flip-flop 30.

The collector of transistor Q20 is connected via a resistor R50 to one terminal of a DC reversible motor 50. The other terminal of motor 50 is connected to the collector of transistor Q10. One and the other terminals of motor 50 are grounded via capacitors C50 and C52, respectively. Capacitors C50 and C52 absorb pulse noises generated from motor 50. Resistor R50 prohibits an over current from flowing to motor 50.

The collectors of transistors Q10 and Q20 are respectively connected to the collectors of NPN transistors Q30 and Q40. Thus, the collectors of transistors Q30 and Q40 are coupled to both terminals of the motor 50. The emitters of transistors Q30 and Q40 are grounded. The base of transistor Q30 is connected via a resistor R30 to the collector of transistor Q40, and is grounded via a parallel circuit of a resistor R32 and a capacitor C30. The base of transistor Q40 is connected via a resistor R40 to the collector of transistor Q30, and is grounded via a parallel circuit of a resistor R42 and a capacitor C40. The base of transistor Q40 is coupled through a trigger switch S20 to the circuit ground.

Resistors R30, R32 and capacitor C30 form a first coupling circuit having a first time constant TC1. Time constant TC1 is determined by R30, R32, C30 and the base-emitter resistance of Q30. Similarly, resistors R40, R42 and capacitor C40 form a second coupling circuit having a second time constant TC2. Time constant TC2 is determined by R40, R42, C40 and the base-emitter resistance of Q40. In this embodiment, the conditions of Q30=Q40, R30=R40, R32=R42 and C30>C40 are settled. That is, TC1>TC2. Transistors Q30 and Q40 are cross-coupled through the first and second coupling circuits mentioned above. Such cross-coupled transistors Q30 and Q40 form a second flip-flop 40.

The first and second flip-flops 30 and 40 constitute a motor drive circuit 20. The circuit ground of circuit 20 is connected to a ground terminal of the power supply 10.

The operation of FIG. 1 circuit will be described with referring to FIGS. 2A to 2E.

Assume here that, before a time t10 or an initial stage, the switches S10 and S20 are OFF, and the capacitors C30 and C40 are completely discharged. Also assume that the conditions of Q10=Q20, Q30=Q40, R10=R20, R12=R22, R30=R40, R32=R42, and C30>C40 are established.

Switch S10 is turned on at time t10 (FIG. 2A). Then, the base of transistor Q30 is biased by the power supply voltage Vcc through resistors R12, R10 and R30. At the same time, the base of transistor Q40 is biased by voltage Vcc through resistors R22, R20 and R40. In this case, since C30>C40, or TC1>TC2, the transistor Q40 is turned on before the transistor Q30 is rendered conductive. Thus, immediately after time t10, transistors Q30 and Q40 are conductive and non-conductive, respectively, and the base of transistor Q40 is biased with a given potential V40 (FIG. 2C). Although the base potential V30 of transistor Q30 transiently rises immediately after time t10, potential V30 will soon falls (FIG. 2D, part X). The ON transistor Q40 biases transistor Q10 via resistor R10, and thus transistor Q10 is turned on. Since transistor Q10 conducts, transistor Q20 is cut off. Accordingly, a forward drive current IF is flowing through transistors Q10, Q40 and motor 50 so that motor 50 rotates in the clockwise direction or a forward direction (FIG. 2E).

After the motor 50 completes its given actuation, switch S20 is instantaneously turned on at a time t12 (FIG. 2B). The switch S20 turned on short-circuits the base of transistor Q40 to the circuit ground. Therefore, the base potential V40 falls down to the ground potential (FIG. 2C), and transistor Q40 is cut off. Then, the drive current IF becomes zero (FIG. 2E), and capacitor C30 is charged through resistor R30. After time t12, the base potential V30 of transistor Q30 rises as capacitor C30 is charged (FIG. 2D). When the potential V30 reaches to a given threshold potential $V_{TH}$ at a time t13 (FIG. 2D), transistor Q30 is turned on. Then, transistor Q20 is biased by the conducted transistor Q30 via resistor R20, and is rendered conductive. Accordingly, a reverse drive current IR is flowing through transistors Q20, Q30 and motor 50 so that motor 50 rotates in the counterclockwise direction or a reverse direction (FIG. 2E).

After the reverse actuation of motor 50 is completed, switch S10 is turned off at a time t14 (FIG. 2E). Then, the drive current IR becomes zero (FIG. 2E), and the whole power supply for motor drive circuit 20 is stopped (FIG. 2A).

FIG. 3 shows a second embodiment of the present invention. In FIG. 3, the collector of transistor Q20 is connected to one terminal of motor 50 via resistors R24 and R50. The other terminal of motor 50 is connected to the collector of transistor Q10 through a stop switch S30 and a resistor R14. A diode D30 is connected in parallel with switch S30 such that the cathode of diode D30 is turned to motor 50 side. The juncture of resistor R14 and switch S30 is connected to the collector of transistor Q30. The juncture of resistors R24 and R50 is connected to the collector of transistor Q40.

The circuit of FIG. 3 will operate as follows.

When power switch S10 is turned on (FIG. 4A, time t20), there is the condution of C30>C40 as in the case of FIG. 1, transistors Q10 and Q40 are turned on and transistors Q20 and Q30 are turned off. Then, a forward drive current IF is supplied via diode D30 to motor 50 (FIG. 4D, time t20-t22). In this case, since diode D30 is conductive, the current IF flows into motor 50 independently of the ON/OFF state of switch S30. After and soon time t20, switch S30 is turned on (FIG. 4C, time t21).

When trigger switch S20 is turned on (FIG. 4B, time t22), transistors Q10 and Q40 are cut off and transistors Q20 and Q30 are turned on. Then, a reverse drive current IR flows into motor 50 through the turned on switch S30 (FIG. 4D, time t22-t24). In FIG. 4D, for brevity's sake, a zero current period such as the period of time t12-t13 of FIG. 2E is not illustrated.

After the reverse actuation is finished, switch S30 is turned off (FIG. 4C, time t24). Then, although transistors Q20 and Q30 are still conductive, the energizing current for motor 50 is interrupted by diode D30. After and soon time t24, switch S10 is turned off and the whole power supply for motor drive circuit 20 is stopped (FIG. 4A, time t25).

The switch S30 and diode D30 form a stop switch circuit. The motor drive circuit 20 with such stop switch circuit is useful when there is a time lag (time t24-t25 in FIGS. 4A, 4C) of OFF-operation of switch S10, and motor 50 should be stopped at time t24 in FIG. 4D. For example, the circuit 20 in FIG. 3 is suitable to the automatic loading apparatus of Japanese Patent Application No. 55-138,138 filed on Oct. 2, 1980.

FIG. 5 shows a third embodiment of the invention. In FIG. 5, the base of transistor Q10 is connected to the emitter of a PNP transistor Q12. The base of transistor Q12 is connected to the emitter of transistor Q10 via a resistor R16 and to the collector of transistor Q20 via resistor R10. The collector of transistor Q12 is connected to the base of transistor Q40. Similarly, the base of transistor Q20 is connected to the emitter of a PNP transistor Q22. The base of transistor Q22 is connected to the emitter of transistor Q20 via a resistor R26 and to the collector of transistor Q10 via resistor R20. The collector of transistor Q22 is connected to the base of transistor Q30.

The transistor Q12 boosts the base current of each of transistors Q10 and Q40, and the transistor Q22 boosts the base currents of respective transistors Q20 and Q30. Thus, transistors Q10–Q40 may readily feed a large motor drive current into motor 50, even though the current amplification factor $h_{FE}$ of each of transistors Q10–Q40 is relatively low.

FIG. 6 is a practical application example of the motor drive circuit 20 of this invention. FIG. 6 shows a configuration of an automatic loading apparatus of video disc player in which the video disc is automatically taken on to a turntable and taken off therefrom. In FIG. 6, a turntable 100 is mounted on the rotor shaft of a disc drive motor 102. A lift plate 104 for taking on and off a video disc 106 to and from turntable 100 is arranged around turntable 100. The up/down actuation of lift plate 104 is carried out by a disc lifting actuator 110. Actuator 110 has a screw shaft 112 which is coupled to lift plate 104 and is driven by the motor 50 via a worm gear 114.

When a keyboard 130 is operated to turn on power switch S10, motor 50 starts to rotate in forward direction (corresponding to time t20 of FIGS. 4A and 4D). Then, lift plate 104 falls down toward turntable 100. After and soon the plate 104 starts to fall, a position sensor 122 renders stop switch S30 conductive (corresponding to time t21 of FIG. 4C). When lift plate 104 reaches its lower end position, i.e. video disc 106 is taken on turntable 100, a position sensor 124 senses this state and renders power switch S10 nonconductive (corresponding to time t25 of FIG. 4A). In result, the preparation of play operation of video disc 106 is completed.

When the play operation of video disc 106 is finished, a keyboard 132 is operated to turn on power switch S10 and trigger switch S20. Then, motor 50 starts to rotate in reverse direction (corresponding to time t22 of FIGS. 4B and 4D). The reversely rotated motor 50 drives the actuator 110 so that lift plate 104 starts to rise. When lift plate 104 closely approaches to its upper end position, position sensor 122 senses this state and renders stop switch S30 nonconductive, then motor 50 is stopped (corresponding to time t24 of FIGS. 4C and 4D). After the motor 50 is stopped, and when the disc 106 together with its casing is removed from the player, a position sensor 120 senses the removal of the video disc and renders power switch S10 nonconductive (corresponding to time t25 of FIG. 4A).

It will be apparent to those skilled in the art that various modifications and variations could be made in the motor drive apparatus of the present invention without departing from the scope of the invention claimed.

What is claimed is:

1. A motor drive apparatus for driving a reversible motor first in a first direction, then stopping it and then driving it in a second direction opposite to said first direction, comprising:
    power switch means for receiving current from a power supply and passing that current in a closed state thereof or blocking current in an open state thereof;
    a first flip-flop having 1st and 2nd transistors of a first conductivity type, a base of said 1st transistor being coupled to a collector of said 2nd transistor, a base of said 2nd transistor being coupled to a collector of said 1st transistor, emitters of said 1st and 2nd transistors being coupled to, said power switch means for receiving current therefrom when said switch means is in said closed state and the collectors of said 1st and 2nd transistors being respectively coupled to opposite terminals of said motor;
    a second flip-flop having 3rd and 4th transistors of a second conductivity type opposite to said first conductivity type, emitters of said 3rd and 4th transistors for being coupled to a return of said power supply, the collector of the third transistor being coupled to the collector of the first transistor and the collector of the fourth transistor being coupled to the collector of the second transistor;
    power switch means positioned on a power supply line of said power supply, for conducting a power of said power supply to said 1st through 4th transistors;
    first coupling means for coupling the base of said 3rd transistor to the collector of said 4th transistor, said first coupling means having a first time constant which retards a potential variation passing through said first coupling means;
    second coupling means for coupling the base of said 4th transistor to the colleccdtor of said 3rd transistor, said second coupling means having a second time constant which retards a potential variation passing through said second coupling means, said first time constant being longer than said second time constant such that said 1st and 4th transistors conduct and said 2nd and 3rd transistors are cut off at a time when said power switch means first conducts current from said power supply, said conductor by said 1st and 4th transistors causing current to flow in a first direction through said motor causing it to operate in said first direction; and
    trigger switch means, coupled to said 4th transistor, for rendering said 4th transistor non-conductive when said trigger switch means is activated, thereby stopping current flow through said motor to stop it, and then causing said 3rd transistor to conduct in response to said first time constant thereby causing current to flow in said second direction through said motor, causing it to operate in said second direction.

2. A motor drive according to claim 1, further comprising:
    stop switch means located on a drive current path conducting power from said power supply to said motor, for cutting off the supply of power to said motor after an actuation of said trigger switch means.

3. A motor drive apparatus according to claim 2, wherein said stop switch means includes a stop switch in said drive current path, and a diode, in parallel with said switch, for blocking the power on said drive current path when said 2nd and 3rd transistors conduct and said stop switch is open.

4. A motor drive apparatus for driving a DC reversible motor in either direction thereof, comprising:
    a 1st transistor of a first conductivity type having an emitter adapted to be coupled to a first potential terminal of a DC power supply;
    a 2nd transistor of said first conductivity type having an emitter coupled to the emitter of said 1st transistor, and having a base and collector respectively coupled to a collector and a base of said 1st transistor;

a 3rd of a second conductivity type having an emitter adapted to be coupled to a second potential terminal of said power supply, and having collector coupled to the collector of said 1st transistor;

a 4th transistor of said second conductivity type having an emitter coupled to the emitter of said 3rd transistor, and having a collector coupled to the collector of said 2nd transistor;

a first resistor for coupling the base of said 3rd transistor to the collector of said 4th transistor;

a second resistor for coupling the base of said 4th transistor to the collector of said 3rd transistor;

a first capacitor coupled between the base and emitter of said 3rd transistor;

a second capacitor coupled between the base and emitter of said 4th transistor;

a power switch coupled between the one potential terminal of said power supply and the emitter of said 1st transistor; and a trigger switch coupled to the base and emitter of said 4th transistor for cutting off said 4th transistor, wherein one terminal of said motor is coupled to the collector of said 3rd transistor, and the other terminal of said motor is coupled to the collector of said 4th transistor, and wherein the time constant of said first resistor and said first capacitor is larger than the time constant of said second resistor and said second capacitor.

5. A motor drive apparatus according to claim 4, further comprising:

a diode located in a drive current path of said motor, for unidirectionally conducting a drive current in a first direction flowing through said 1st and 4th transistors when these transistors are conductive; and a top switch coupled in parallel with said diode, for conducting, when closed, a reverse drive current flowing through said 2nd and 3rd transistors when these transistors are conductive, and blocking, when open, a drive current in a second direction opposite to said first direction.

6. A motor drive apparatus for driving a reversible motor first in a first direction, then stopping it and then driving it in a second direction opposite the said first direction, comprising:

power switch means for receiving current from a power supply and conducting that current in a closed state thereof or blocking current in an open state thereof;

a first flip-flop having 1st and 2nd transistors of a first conductivity type, a base of said 1st transistor being coupled to a collector of said 2nd transistor, a base of said 2nd transistor being coupled to a collector of said 1st transistor, emitters of said 1st and 2nd transistors being coupled to said power switch means for receiving current therefrom when said switch means is in said closed state, an emitter of said 2nd transistor being coupled to a first terminal of said motor;

stop switch means coupling an emitter of said 1st transistor to a second terminal of said motor, said stop switch means comprising a stop switch and a diode in parallel with said stop switch;

a second flip-flop having 3rd and 4th transistors of a second conductivity type opposite to said first conductivity type, emitters of said 3rd and 4th transistors for being coupled to a return of said power supply, the collector of the 3rd transistor being coupled to the collector of the 1st transistor and the collector of the 4th transistor being coupled to the collector of the 2nd transistor;

first coupling means for coupling the base of said 3rd transistor to the collector of said 4th transistor, said first coupling means having a first time constant which retards a potential variation passing through said first coupling means;

second coupling means for coupling the base of said 4th transistor to the collector of said 3rd transistor, said second coupling means having a second time constant which retards a potential variation passing through said second coupling means, said first time constant being longer than said second time constant such that said 1st and 4th transistors conduct and said 2nd and 3rd transistors are cut off at a time when said power switch means first conducts current from said power supply, said conduction by said 1st and 4th transistors causing current to flow in a first direction through said diode and said motor causing it to operate in said first direction; and trigger switch means, coupled to said base of said 4th transistor, for rendering said 4th transistor nonconductive when said trigger switch means is activated, thereby stopping current flow through said motor to stop it, and then causing said 3rd transistor to conduct in response to said first time constant thereby causing current to flow in said second direction through said motor causing it to operate in said second direction.

* * * * *